United States Patent [19]

Blazek John M. et al.

[11] Patent Number: 4,764,817
[45] Date of Patent: Aug. 16, 1988

[54] VIDEO RECORDING CAMERA

[75] Inventors: Blazek John M.; John R. Tipton, Jr., both of Baltimore, Md.

[73] Assignee: Leonard Bloom, Towson, Md.; a part interest

[21] Appl. No.: 60,250

[22] Filed: Jun. 10, 1987

[51] Int. Cl.⁴ .............................................. H04N 5/76
[52] U.S. Cl. .................................... 358/341; 358/342; 358/909; 358/906; 360/19.1
[58] Field of Search ................ 358/335, 310, 341–343, 358/906, 907, 909; 360/10.1, 19.1, 77

[56] References Cited

U.S. PATENT DOCUMENTS 4,453,186  6/1984  Watatani et al. .............. 358/341 X
4,531,161  7/1985  Murakoshi ..................... 358/906 X
4,688,105  8/1987  Bloch et al. .................... 358/342 X Primary Examiner—L. T. Hix
Assistant Examiner—D. Rutledge
Attorney, Agent, or Firm—Leonard Bloom

[57] ABSTRACT

A hand-held video recording camera includes a lens and an image pickup operatively arranged to receive image information from the lens for converting the image information into an electric image data output signal. A microphonic arrangement in or on the camera is operatively arranged to receive sound from a subject or subjects within view of the lens for producing audio signals corresponding to the sound received. Means are provided within the camera for recording signals representing the image data and audio signals. A source of further audio signals is provided within the hand-held camera. Audio signal mixing means within the hand-held camera mix the audio signals corresponding to the sound received by the microphone arrangement and to the further audio signals from the internal source. The audio mixing means has its output coupled to the recording means so that signals representing the audio signals can be recorded, as well as signals representing image data. Reproducing means carried by or within the hand-held recording camera and responsive to the further audio signals from the source of further audio signals within the hand-held camera projects sound corresponding to the further audio signals toward a subject or subjects being recorded.

43 Claims, 6 Drawing Sheets

VIDEO RECORDING CAMERA

BACKGROUND OF THE INVENTION

1. Field of the Invention

The present invention relates to a video camera which includes a video recorder (VCR). More particularly, the invention relates to such a camera which is portable and includes circuitry to receive and to mix at least two audio inputs, one of which may be from a microphone arrangement responsive to sound from the subject or subjects being recorded.

2. Description of the Prior Art

A hand-held video camera having an image sensor, such as a charge coupled device (CCD), and an integral VCR is known from U.S. Pat. No. 4,530,015 granted July 16, 1985 to Seiichi Yanagida et al. and entitled "Camera with Integral Magnetic Recorder," an optical system, a VTR section and a hand-grip being supported on three substantially perpendicular integral support members. No circuitry is provided for recording any audio or audible signals.

A hand-held video recording camera having an image pickup and a microphone for picking up audible sounds from a subject or subjects being recorded is disclosed in U.S. Pat. No. 4,511,932 entitled "Video Recording Camera" and granted on Apr. 16, 1985 to Tatsuzo Ushiro. No circuitry is provided for recording audio or audible signals from any source other than a single microphone.

A hand-held video recording camera which includes a demountable video tape recorder (VTR), as well as a microphone for picking up audible sounds from a subject or subjects being recorded is known from U.S. Pat. No. 4,547,815 entitled "Detachably Connected Video Camera Video Recorder" granted on Oct. 15, 1985 to Takashi Kimura. Control buttons are provided on the main body of the camera for selecting the operational mode thereof. No provision is made for receiving any audio or audible signals from any source other than the single microphone.

A hand-held video recording camera which may be provided with two microphones is disclosed in U.S. Pat. No. 4,550,343 entitled "Video Camera Apparatus" granted to Nobuyuki Nakatani on Oct. 29, 1985, the two microphones being provided to allow the audible sounds from a subject or subjects to be received and recorded in stereo, one of the microphones being a left (L) channel microphone while the other is a right (R) channel microphone. No circuitry is provided for recording any audio or audible signals from a source other than the subject or subjects.

Commercially available, hand-held video recording cameras are known. One of these, available from Zenith Electronics Corporation, whose address is 1000 Milwaukee Avenue, Glenview, Ill. 60025, under the designation Model VM7100, includes a stereophonic high fidelity audio recording and playback, using rotary audio heads, a high fidelity stereo microphone arrangement being carried on the camera proper. A service manual is available from the Zenith Video Tech Corporation, a subsidiary of the Zenith Electronics, under the designation 5M-CPC 923-2240 relating to the commercially available camera, the manual being incorporated herein in its entirety by reference. External jacks are provided to receive audio and/or video inputs from conventional prerecorded VHS high fidelity stereo cassettes, tuners and television sets. No circuitry is provided to effect mixing of audio from any internal (on-board) audio source with the signals received from the microphone arrangement nor for outputting audible or audio signals from any internal (on-board) audio source to the subject or subjects being recorded.

SUMMARY OF THE INVENTION

An object of the present invention is to provide a hand-held video recording camera which includes an on-board source of audio signals which may be acoustically reproduced within the hearing of a subject or subjects being recorded via a speaker arrangement on or electronically coupled to the camera proper.

Another object of the present invention is to provide a hand-held video recording camera including an on-board source of audio signals which may be mixed with audio signals from a microphone arrangement operatively positioned on or in the camera to receive sound from the subject or subjects being recorded.

An additional object of the present invention is to provide a hand-held video recording camera which contemporaneously achieves the above-noted objects.

A further object is to provide a hand-held video camera which includes a source of recorded audio signals to be recorded therein which may be started and stopped, as the video recording is started and stopped, so that on playback the audio interruptions are virtually not discernable to a listener.

The foregoing objects, as well as others which are to come apparent from the text below, are achieved in accordance with the present invention as defined in the appended claims.

The present invention can be seen as being in a hand-held video recording camera which has a lens, an image pickup means operatively arranged to receive image information from the lens for converting the image information into an electric image data output signal and microphonic means. The microphone means are operatively arranged to receive sound from a subject or subjects within view of the lens for producing audio signals corresponding to the sound received. Means record signals representing the image data and audio signals. In accordance with a salient novel feature of the present invention, a source is provided within the hand-held recording camera of further audio signals. Audio mixing means within the hand-held recording camera mix the audio signals corresponding to the sound received by the microphone means and to the further audio signals. The audio mixing means has its output coupled to the means for recording signals representing the image data and the audio signals. Reproducing means carried by or coupled to the hand-held recording camera respond to the further audio signals from the source of further audio signals within the hand-held recording camera project sound corresponding to the further audio signals toward a subject or subjects to be recorded.

The source within the hand-held recording camera of audio signals preferably is a compact disk player. Of course, other sources, such as an audio cassette, may replace the compact disk player.

Signal level adjusting means, desirably provided to adjust level of the further audio signals, is in circuit between the source of the further audio signals and the reproducing means responsive to the further audio signals. Thus, the level of sound projected toward a subject or subjects may be adjustably set.

The recording camera desirably includes at least one hand-grip. The means in circuit for adjusting level of the further audio signals, whereby level of sound projected may be adjustably set, includes an actuator carried by the hand-grip and accessible to an operator holding the camera.

The recording camera also may include additional means for adjusting the level of the further audio signals in circuit between the source of further audio signals and the audio mixing means. Thus, the level of the audio signals from the source of further audio signals can be independently adjusted with respect to audio signals received from the microphone means.

The recording camera desirably includes a hand-grip. The means in circuit between the source of further audio signals and the audio mixing means may include an actuator carried by the hand-grip and accessible to an operator holding the camera. Thus, the level of the audio signals mixed from the source of further audio signals can be adjusted independently of the sound projected toward the subject or subjects.

The recording camera desirably includes a hand-grip as noted above, the means in circuit for adjusting level of the further audio signals including a first actuator carried by the hand-grip. Additional means for adjusting the level of the further audio signals are in circuit between the source of further audio signals and the audio mixing means. The additional means includes an additional actuator carried by the hand-grip. The actuators are accessible to an operator holding the camera.

The recording camera of the present invention is desirably provided with means for assuring that whenever the video recorder is restarted to record scenes in sequence, the audio from the internal source of further audio signals starts to be recorded at virtually the point of prior interruption.

The recording camera may include means on the camera for receiving an audio signal from an external audio source.

The recording camera may include means responsive to the presence of a connection to the receptor means for interrupting audio being fed to the mixing means from the source of the further audio signals within the hand-held recording camera and for allowing audio signals from the external audio source to be fed to the mixing means via said connection and the receptor. In this case, provisions may be made so that the audio from the external source may also be fed to the reproducing means so as to be heard by the subject or subjects being recorded.

The recording camera may include receptor means on the hand-held camera coupled to the source of audio signals within the hand-held camera, further reproducing means being provided for projecting sound corresponding to the further audio signals toward a subject or subjects to be recorded. Extension cord means extend from the receptor means to the further reproducing means whereby audio signals from the source of further audio signals may be projected toward the subject or subjects from points which are remote from the hand-held recording camera. As an alternative, a short range, modulated radio transmitter may be carried by the hand-held recording camera to transmit the further audio signals, in this case as modulation on a carrier, to a remote radio receiver, which demodulates the signal and supplies the resulting audio to the further reproducing means.

The recording camera may include means responsive to the presence of a connection to receptor means reproducing means carried by the hand-held camera, to interrupt audio signals being fed to the reproducing means carried by the recording camera and to allow instead audio signals from the source of further audio signals within the recording camera to be fed to the further reproducing means, which may be a speaker connected to the receptor means via a pair of leads or cable.

The recording camera may include receptor means on the camera for receiving an external audio signal from an external audio source for recording.

The recording camera may include means responsive to the presence of a connection to the receptor means for interrupting audio being fed to the mixing means from the source of the further audio signals within the hand-held camera and for allowing audio signals from the external audio source to be fed to the mixing means via the connection and the receptor.

The recording camera may include receptor means on the hand-held camera coupled to the source of audio signals within the hand-held camera, further reproducing means for projecting sound corresponding to the further audio signals toward a subject or subjects to be recorded, and extension cord means extending from the receptor means to the further reproducing means. Thus, audio signals from the source of the further audio signals can be projected toward the subject or subjects from points which are remote from the hand-held recording camera.

The recording camera may include means responsive to the presence of a connection to the receptor means for interrupting audio being fed to the reproducing means carried by the hand-held camera and for allowing audio signals from the source of further audio signals within the recording camera to be fed to a modulated radio transmitter carried by the camera. In this case, a radio receiver positioned remotely from the camera may be used to receive radio signals from the transmitter, demodulate the received signals to derive the audio therefrom and fed the audio to a speaker or the like. It is also possible to use one or more radio receivers carried by respective subjects to be recorded, each subject being provided with an earphone or the like to hear the audio derived from demodulation of the received radio signals.

From a first subcombination aspect, the present invention can be viewed as being in a hand-held video recording camera having a lens, an image pickup means operatively arranged to receive image information from the lens for converting the image information into an electric image data output signal and microphonic means. The microphone means, which receive sound from a subject or subjects within view of the lens, produce audio signals corresponding to the sound received. Means record signals representing the image data and audio signals. In accordance with the present invention, a source is provided within the hand-held recording camera of further audio signals. Audio mixing means within the hand-held recording camera for mixing the audio signals corresponding to the sound received by the microphone means and to the further audio signals, the audio mixing means having its output coupled to the means for recording signals representing the image data and the audio signals.

From another vantage point, the present invention in a second subcombination aspect, can be seen as being in a hand-held video recording camera having a lens, an image pickup means operatively arranged to receive image information from the lens for converting the image information into an electric image data output signal and microphonic means. The microphone means are operatively arranged to receive sound from a subject or subjects within view of the lens for producing audio signals corresponding to the sound received and means for recording signals representing the image data and audio signals. In accordance with the present invention, a source of further audio signals is provided within the hand-held recording camera. Reproducing means carried by the hand-held recording camera respond to the further audio signals from the source of further audio signals within the hand-held recording camera for projecting sound corresponding to the further audio signals toward a subject or subjects to be recorded.

The invention can also be seen as being in a hand-held video recording camera having a lens, an image pickup means operatively arranged to receive image information from the lens for converting the image information into an electric image data output signal and microphonic means operatively arranged to receive sound from a subject or subjects within view of the lens for producing audio signals corresponding to the sound received. Means for recording signals representing the image data and audio signals are provided. In accordance with a salient feature of the invention, a source of further audio signals is provided within the camera, audio mixing means being provided within the hand-held camera for mixing the audio signals corresponding to the sound received by the microphone means and to the further audio signals. The audio mixing has its output coupled to the means for recording signals representing the image data and the audio signals. Means assure restarting the recording of signals from the audio source within the hand-held camera at virtually the same point at which the signals from the source had been interrupted immediately preceding the stopping of recording the video and audio. Thus, one can play back an interrupted recording sequence of visual scenes, with the audio from the source of the further audio signals seemingly not interrupted.

The invention can also be seen as being in a system which includes a hand-held video recording camera having a lens, an image pickup means operatively arranged to receive image information from the lens for converting the image information into an electric image data output signal and microphonic means operatively arranged to receive sound from a subject or subjects within view of the lens for producing audio signals corresponding to the sound received. Means for recording signals representing the image data and audio signals are provided. In accordance with a salient feature of the invention, a source of further audio signals is provided, audio mixing means being provided within the hand-held camera for mixing the audio signals corresponding to the sound received by the microphone means and to the further audio signals. The audio mixing has its output coupled to the means for recording signals representing the image data and the audio signals. Means assure restarting the recording of signals from the source of further audio signals at virtually the same point at which the signals from the source had been interrupted immediately preceding the stopping of recording the video and audio. Thus, one can play back an interrupted recording sequence of visual scenes, with the audio from the source of the further audio signals seemingly not interrupted.

DETAILED DESCRIPTION OF THE PREFERRED EMBODIMENTS

Figure 1A:
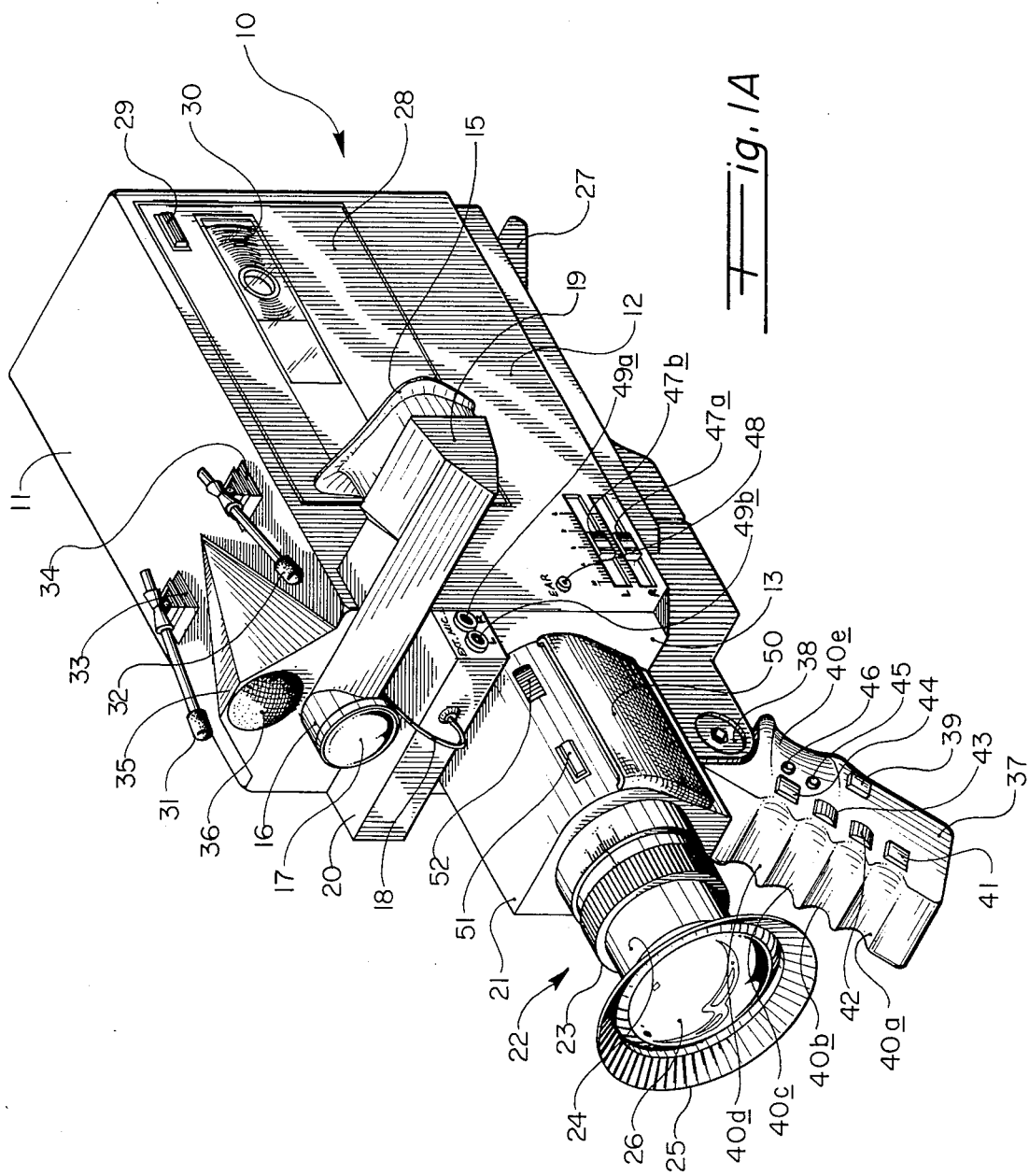
FIG. 1A is a pictorial illustration of a hand-held video recording camera constructed in accordance with an exemplary embodiment of the present invention, the viewing vantage point being such that the left side of the camera is visible in detail.
Figure 1B:
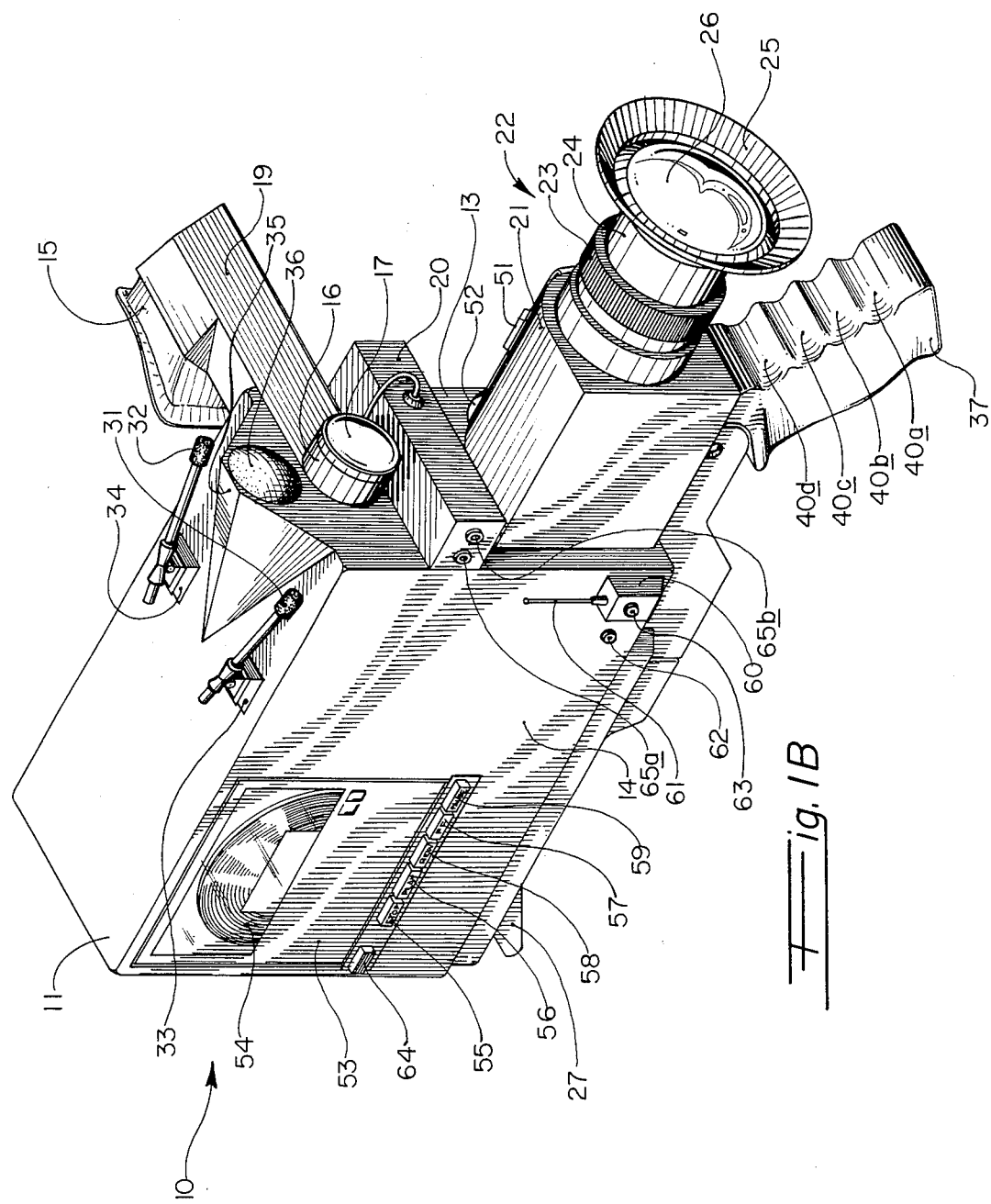
FIG. 1B is a pictorial illustration of the hand-held video recording camera of FIG. 1A, the viewing vantage point in this case being such that the right side of the camera is visible in detail.

As illustrated in FIGS. 1A and 1B, a preferred, exemplary embodiment of a hand-held recording video camera, constructed in accordance with the present invention, is indicated generally by the numeral 10. The video camera includes a box-like main housing defined by a substantially rectangular, vertical, rear wall (not visible), a horizontal, bottom wall (not visible), a substantially rectangular top wall 11, a substantially rectangular vertical, left wall 12 (FIG. 1A), a vertical front wall 13 and a substantially rectangular vertical right wall 14 (FIG. 1B).

A cylindrical viewfinder housing 16 having a lens 17 on its distal end extends outwardly from the front wall 13 near the top thereof. Conventional optics (not visible) within the camera 10 effect the transmittal of images within the viewing angle of the lens 17 in a horizontal, hollow support member 19 which preferably is integral with the main housing and extends outwardly from the left wall 12. The support member 19 has its distal end turned to the rear by substantially 90°. A resilient eye shade 15 is positioned on the distal end of the hollow support 19 so that a cameraman or camerawoman may readily bring his or her head into contact with the shade, thus, preventing ambient light from interfering with his or her viewing, with the right eye, an image from the viewfinder lens 17, conventional optics being provided within the hollow support 19 for this purpose. Of course, conventional electronic imaging could be used instead.

A small forward extension housing 20 is provided on the front wall 13 of the camera 10, conventional circuitry being provided therein, if desired, to supply light images representing operating conditions, such as tape speed and the like, so that these images may be superimposed over the optical image from the viewfinder lens 17 and, consequently, be visible to the cameraman or camerawoman using the viewfinder 16. A multilead cable 18 is provided to supply signals from internal circuit points within the camera 10 to circuitry, including conventional decoders, within the housing 20, which develop the light images to be superimposed over the optical image. An electronic viewfinder of the type used in the video recording camera is available from the Zenith Electronics Corporation under the designation VM7100 can be used if one wishes to monitor the scene being recorded, while allowing one to see mode and warning indicators as well.

The camera 10 includes convention imaging and scanning systems, such as a CCD and associated circuitry within a further housing 21 extending outwardly from the front wall 13 beneath the housing 20. The optical imaging section, generally designated by the numeral 22 is conventional, including as shown, a knurled, internally threaded ring 23 which effects the axial movement of a cylindrical telescoped zoom lens support 24. An objective lens 26 carried by the support 24, is surrounded at its periphery by a shading member 25. It is to be appreciated that the imaging system could be an automatic-focus, power zoom lens, such as the type used in the above-mentioned VHS recording video camera available under the designation VM7100 from the Zenith Electronics Corporation.

An operator's conventional shoulder-engaging support 27 is provided, the support being fixed to and carried, as illustrated, from the bottom wall of the camera 10. A removable video cassette is provided within the camera 10, its reel of video recording tape 30 being visible through an aperture in a panel 28 (FIG. 1A) behind which the cassette is held. A conventional depressable latching button 29 is provided for allowing one to remove from and to insert video cassettes into the camera 10, as desired. The video and audio signals to be recorded are conventionally recorded on the recording tape 30 in a conventional manner, such as in the manner utilized in the above-mentioned VHS camera of the Zenith Electronics Corporation available under the designation VM7100.

A pair of microphones 31 and 32, which are respectively right and left microphones, are shown, are conventionally mounted on the top wall 11.

A pair of microphones 31 and 32, which are respectively right and left microphones, are as illustrated respectively swivelly mounted on respected supports 33 and 34 fixed to the top wall 11 of the camera 10. Thus, stereo audio inputs responsive to sounds from a subject or subjects being recorded is possible and contemplated. It is to be understood that this microphone array or a similar one could be housed within the camera 10, as is the case with respect to the above-mentioned VHS camera sold under the designation VM7100 by the Zenith Electronics Corporation.

A multifaceted, shaped speaker housing 35 extends upwardly from the top wall 11 in vicinity of the front wall 13 above the viewfinder 16. An opening, covered by a speaker grill 36, is provided in the front of the housing 35 so that sound can be projected toward a subject or subjects being recorded. The sound sensitivity pattern of the speaker is desirably chosen and the microphones 31, 32 so positioned, with respect thereto, that little or no energy therefrom is picked up by the microphones 31, 32 or radiated to the rear.

In accordance with the present invention, an internal audio source is provided within the camera 10. As shown, the audio source is constituted by a compact disk (CD) player 53 (FIG. 1B), a compact disk 54 being visible through a window in the player. The compact disk player is provided with conventional respective stop, play, rewind, fast-forward and pause control pushbutton actuators 55-59. The CD player 53 can be removably supported with the camera 10 by conventional techniques. A manually operable conventional latching button 64 is provided for the purpose of allowing one to unlatch the door behind which the CD 54 is positioned to allow one to remove and to replace it. It is to be appreciated that the internal audio source may be a conventional audio cassette or the like, instead of the CD player 53, which is to be preferred. The CD player 53 need not have its own power source, but can be powered from the same conventional rechargeable batteries within the camera 10 which supply power to the video recorder. Conventional latches (not shown) may be used to allow one to remove the CD player 53 from the camera 10 and use it apart from the camera.

A pair of receptacles 65a and 65b accessible through the right wall of the housing 20 may be provided for receiving respective left and right audio signal inputs from an external source or sources (not shown) were one to wish to record audio signals from an external source or sources, rather than from the CD player 53. In this case, the insertion of plugs into the receptacles 65a and 65b would, in effect, disconnect the stereo output from the CD player 53 and allow audio supplied to the receptacles 65a and 65b to be recorded and supplied to the speaker behind the grill 36.

A hand-grasp 37 is adjustably articulated between a pair of brackets which extended outwardly from the front wall 13 of the camera 10, an Allen-headed bolt 38 being provided which extends through the left bracket and into a threaded bore within the other bracket. When tightened, the bolt 38 fixes the hand-grip 37 in a comfortable position, which may be adjusted to accommodate different persons. The hand-grip 37 includes four scalloped grooves 40a -40d on its anterior surface, these grooves being so shaped and positioned that an operator can position the four fingers of his or her right hand in these grooves, with the thumb of the right hand positioned in a somewhat wider curved groove 40e in the posterior surface of the hand-grip 37.

In accordance with the present invention an audio pause actuator button 41 (which can effect a pausing of the CD player 53), a first knurled audio level adjusting actuator 42 (which can effect an adjustment in the audio signal level of outputs from the microphones 31, 32), a second knurled audio level adjusting actuator 42 (which can effect adjustment of the audio signal levels from the CD player 53) and a rocker switch actuator 43 (which can effect a music search of compositions on the CD 54) are provided on a side surface of the hand-grip 37 so that each of these switches can be readily manipulated by the operator's fingers. If desired, electronics circuitry may be provided to sense cut or composition number or time identification indicia or the like on the CD 54 and feed developed signals indicating the cut or composition or time to conventional decoding circuitry which, in turn, would energize a liquid crystal display or the like. Optics could be provided to project an image from the display so that the image would be viewable in the viewfinder 15 as an image superimposed on an image of the scene to be recorded. The technique contemplated is substantially the same as the technique used in superimposing mode and in warning indicators over scenes in a viewfinder of the type used in the camera sold under the designation VM7100 by the Zenith Electronics Corporation.

Two button actuators 45 and 46 are provided in the vicinity of the thumb-receiving groove 40e so that the thumb of a cameraman or camerawoman can readily and comfortably use these button actuators to start/stop the video recording process and/or start/stop the audio feed from both internal and external sources to the VCR within the camera 10. In accordance with another especially useful feature of the present invention an additional actuator 39 is positioned in the vicinity of the thumb-receiving groove 40e, this particular actuator being operatively arranged to initiate an automatic pause-rewind-start-record sequence of events, in accordance with the program sequence set out in FIG. 5 in flowchart from, so that audio from the internal source shown as the compact disk player 53 and its associated compact disk 54 will appear to have not been interrupted, even when the recording processes have been interrupted, for example, when several different scenes are to be recorded. Provisions are made to assure that video recording is always restarted at the end of a complete field or frame and the audio recording restarted at virtually the point of prior interruption, by using the circuitry of FIG. 4 to effect the steps shown in FIG. 5.

As an aid to holding the camera 10 steady, an elastic member 50 fixed to the housing 21 is provided along a curved portion of the outer surface of the housing. A cameraman or camerawoman can place the fingers and palm of the left hand beneath the elastic member 50 along the curved surface, with the fingers in position to depress a rectangular button actuator 51 for turning the power of the camera 10 on and off and to manipulate the knurled actuator 52 for the purpose of adjusting the level of sound projected from the speaker behind the grill 36.

A pair of left and right audio level adjusting slidable actuators 47a and 47b are accessible through the side wall 12 so that the relative signal levels of the outputs from the respective left and right microphones 31 and 32 can be easily set, if desired, to provide a selective balance.

As illustrated the radio transmitter 60 having an antenna 61 is positioned on the camera 10. An audio output receptacle 62 is provided for feeding audio from one or another of the audio channels of the CD player 53 to the transmitter 60 via an input receptacle 63 therein. A suitable short patch cord or jumper (not shown) may be provided for this purpose. When a plug on one end of the jumper is inserted into the receptacle 62, the speaker behind the grill 36 is taken out of circuit so that sound is not projected therefrom. Rather, audio from the CD player 53 is used to modulate the radio transmitter 60, which is provided with a radiating antenna 61. A remote speaker or the like can be coupled to the camera 10 via an extension cord (not shown in FIGS. 1A, 1B) or the like so as to provide audio to a remote speaker or the like (see FIG. 3). In operation when an audio jack or plug is positioned in the receptacle 62 the speaker behind the grill 36 is automatically taken out of circuit, as noted above. The radio transmitter 60 and the extension cord are respective alternatives to using the speaker behind the grill and, in many situations, are to be preferred.

An earphone jack 48 (FIG. 1A) is provided on the housing of the camera 10 so that a cameraman or camerawoman may insert an earphone plug (not shown) therein and hear the audio being recorded. A pair microphone jacks 49a and 49b are provided, in the event remote microphones, instead of using the camera mounted microphones 31, 32, are to be used in picking up sound from the subject or subjects being recorded.

Figure 2:
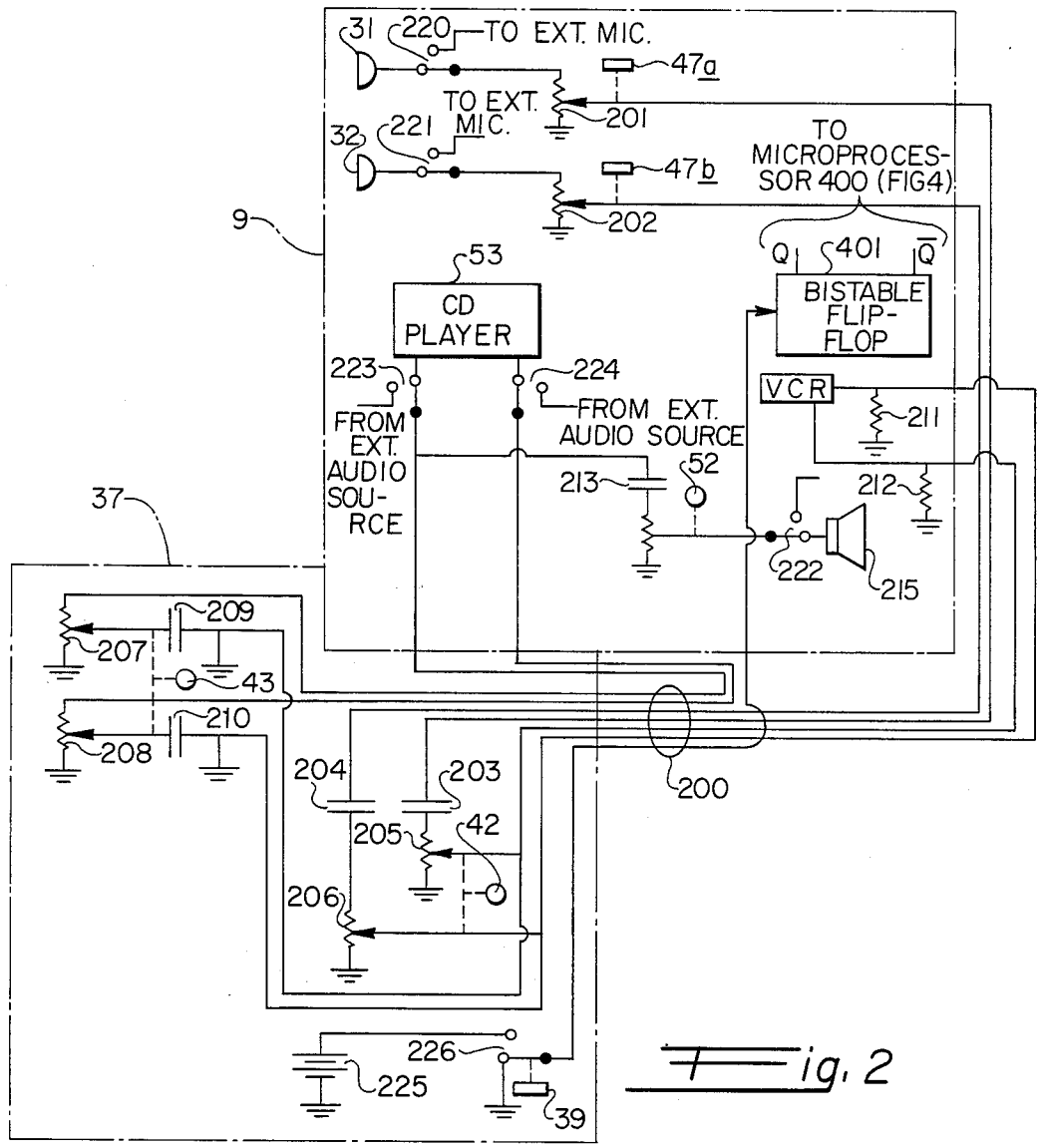
FIG. 2 is a partially block, simplified schematic diagram of a portion of the circuitry used in the hand-held video recording camera illustrated in FIGS. 1A and 1B, the camera, its hand grip and some components being diagrammatically represented by dotted lines.

In accordance with the present invention, as illustrated in FIG. 2, some of the circuit components are housed within the main housing, shown diagrammatically as a dashed-lined block 9, of the hand-held video camera 10 (FIG. 1A, 1B), other of the circuit components being housed within the hand-grasp 37 (FIGS. 1A, 1B), shown diagrammatically as a dashed-line block in FIG. 2.

The electrical outputs from the right and left microphones 31, 32 are respectively connected, via respective single-pole, double-throw switches 220 and 221, to respective level setting potentiometers 201 and 202, the respective output wipers of which are manually adjustable by the respective finger-movable actuators 47a and 47b (also shown in FIG. 1A). The outputs from the respective wipers of the potentiometers 201 and 202 are respectively connected, via respective capacitors 203 and 204 and conductive members within a cable 200 to respective inputs to respective right-, left- mixing potentiometers 205 and 206 within the hand-grasp 37. The respective wipers of the potentiometers 205 and 206 within the hand-grasp 37 (also shown in FIG. 1A) are ganged together so as to jointly movable by manipulating the knurled actuator 42 (also shown in FIG. 1A), illustrated diagrammatically within dashed lines. The CD player 53 (also shown in FIG. 1B) has, as is conventional, respective right-, left- outputs which are conductively connected, via the cable 200, to respective potentiometers 207 and 208 within the hand-grip 37, the respective wipers of these potentiometers, which are ganged for joint movement, being movable by manipulation of the knurled actuator 43 (also shown in FIG. 1A). The audio outputs from the mixing potentiometers 207 and 208 are connected by respective capacitors 209 and 210, via the cable 200, to respective resistors 211 and 212 within the main housing 9 of the camera 10 so as to be recorded on the recording tape 30 (FIG. 1A) together with the video, in conventional fashion, the high (ungrounded) ends of the two resistors 211 and 212 being connected to the respective right- and left- audio recording channels of the VCR within the main housing 9 of the camera 10. Thus, the levels of the audio outputs from the right- and left-microphones 31, 32 and the audio levels from the right- and left-output channels from the CD player 53 can be independently adjusted, using the respective adjusting actuators 42 and 43, the balance of the respective right- and left- microphones being independently adjustable by the actuators 47a and 47b.

As shown, the microphones 31 and 32 can be taken out of the circuit by inserting respective plugs, functionally illustrated by the single-pole, double-throw switches 220 and 221, into the respective receptacles 49a and 49b (FIG. 1A), which plugs could be used to connect respective off-camera right- and left-microphones (not shown) into the circuit in place of the microphones 31 and 32. Such off-camera microphones would be connected to the respective receptacles 49a and 49b via respective extension cords (not shown).

Figure 3:
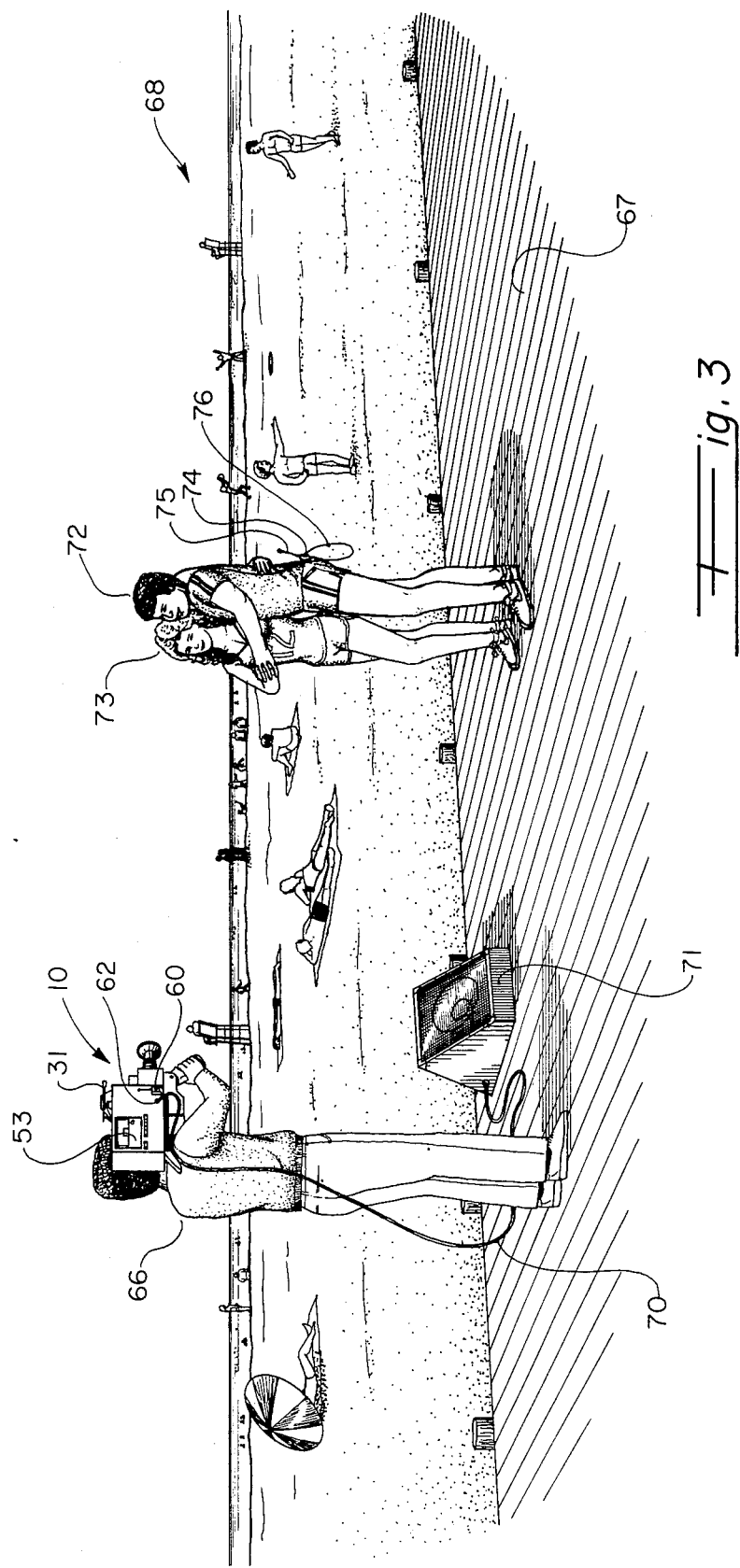
FIG. 3 is a pictorial illustration of a modified version of the hand-held recording camera shown in FIGS. 1A, 1B in which a radio link or a line link communication is used to provide the subject or subjects with signals from the internal audio source.

The circuit also includes a separate feed from the right channel of the CD player 53 (the other or both of the two output channels from the CD player CD could be used) via a coupling capacitor 213 and a level adjusting potentiometer 214, the wiper of which can be set via the knurled actuator 52 (also shown in FIG. 1A). As indicated above, the output from the potentiometer 214 is, as shown, fed to the speaker 215 behind the grill 36 (also visible in FIGS. 1A, 1B). The speaker 215 can be taken out of the circuit by the insertion of a plug functionally illustrated by a single-pole, double-throw switch 222, into the receptacle 62, this plug being connected, in one case, to the extension cord 70 which, as shown in FIG. 3, is connected to a remote speaker 71. Another alternative would be to connect a short patch cord between the receptacles 62 and 63 so that the radio transmitter 60 (FIGS. 1B, 3) would broadcast a modulated radio frequency signal, via its antenna 61, to a remote radio receiver, such as a radio receiver 74 (FIG. 3) having the receiving antenna 75 carried by a subject, such as an individual 72 (FIG. 3), who is to be recorded. Of course, other subjects, such as an additional individual 73 (FIG. 3) could also be provided with a radio receiver so that each could receive at least one channel of the audio from the CD player 53 (FIG. 1B).

Provisions are made for receiving respective right- and left- channel external audio inputs, which can replace the CD player 53 outputs, via respective receptacles 65a and 65b (FIG. 1B). The insertion of respective jacks, functionally illustrated as respective single-pole, double-throw switches 223 and 224, into the receptacles 64a and 64b serve to disconnect the corresponding channels from the CD player 53. In this case, one of the external connected channels would also provide an input to the speaker behind the grill 36 (FIG. 1A, 1B) or the receptacle 62 (FIG. 1B).

The audio pause actuator 41 can be used to pause the CD player 53, this actuator being in parallel with the pause actuator button 59 on the CD player 53. The actuators 45 and 46 are used respectively to start/stop the video cassette and the CD player independently. In accordance with the present invention the actuator 39 is provided to control a microprocessor 400 in the event one wishes to record a series of scenes, while assuring the audio feed from the CD player 53 will not seem, on playback, to have been interrupted. As illustrated in simplified form, the actuator 39 when not being pressed places a low (ZERO) signal on the input terminal of the flip-flop 401, via a single-pole, double-throw switch 226. When the actuator 39 is depressed, a high (ONE) signal, shown schematically as being provided from a d.c. voltage source, illustrated as a battery 225 via the single-pole, double-throw switch 226. The details of the circuits associated with the flip-flop 401 is to be discussed in detail below with reference to FIG. 4.

Reference is made to FIG. 3, to provide an illustration of the hand-held video recording camera 10 in use. As visible in FIG. 3, the camera 10 includes the CD player 53, the right, camera-carried microphone 31 carried by a cameraman 66, shown as standing on a boardwalk 67 at an active beach area designated generally by the numeral 68 and extending beyond the boardwalk 67. An extension cord 70 extends from the receptacle 62 to a remote speaker 71 positioned on the boardwalk 67. A pair of subjects 72, 73 are shown in front of the camera 10 being recorded. One of the subjects 72, a man, is shown with a radio receiver 74, provided with a receiving antenna 75 in his back pocket. An audio signal carrying cord 76 extends from the radio receiver 74 to an earphone (not visible) which the subject 72 has in his ear. The radio receiver 74 is turned to receive signals from the radio transmitter 60, when audio is fed thereto, as mentioned above, via a patch cord (not shown) which may extend from the receptacle 62 on the camera 10 to the receptacle 63 (FIG. 1A) on the radio transmitter 60. In this case, the extension cord 70 is removed from the receptacle 62 and the patch cord (not shown) used to connect the audio signal to the transmitter 60.

Figure 4:
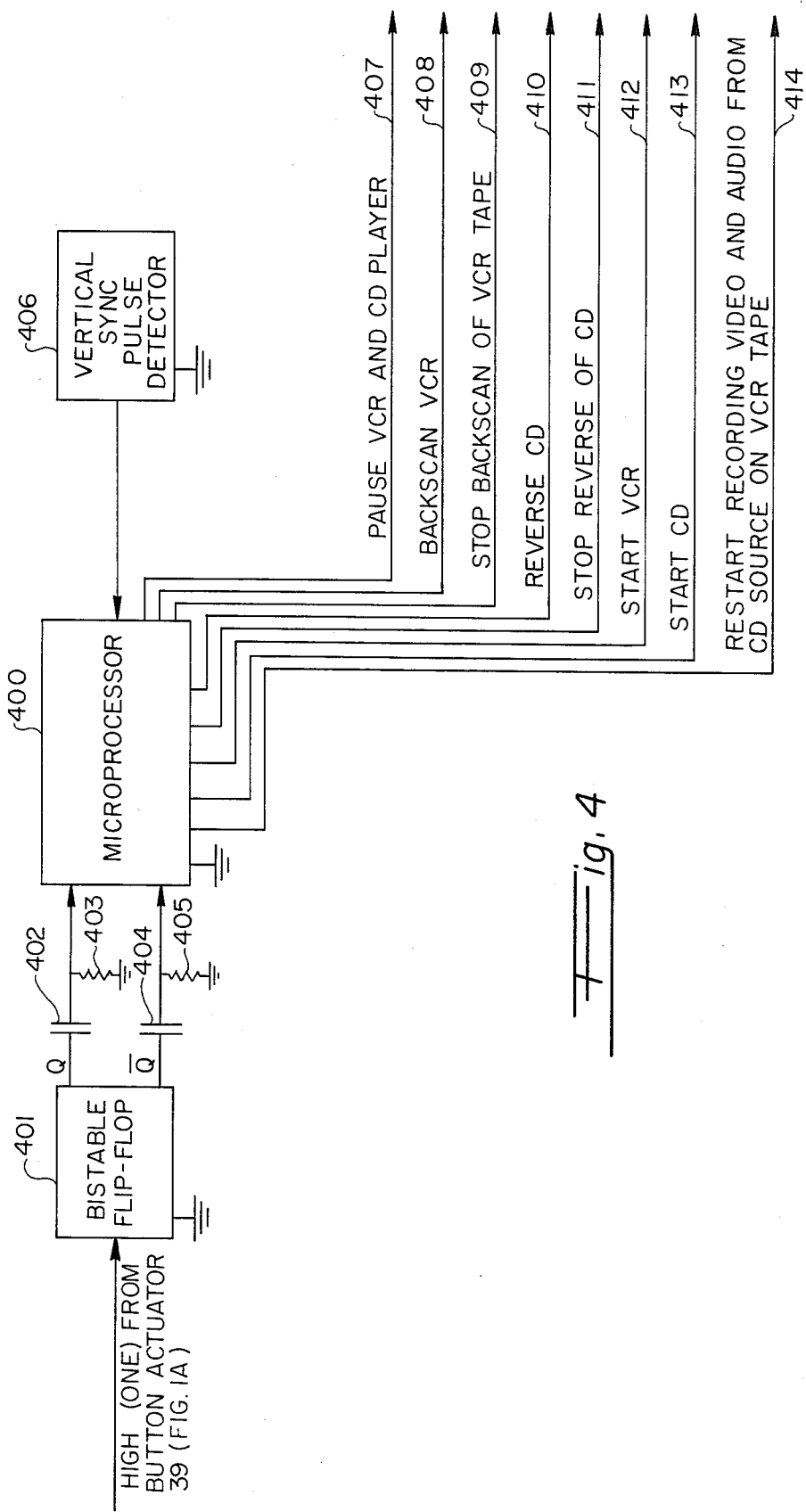
FIG. 4 is a simplified block diagram of an automatic control circuit including a microprocessor, which may be used in the hand-held recording cameras of FIGS. 1A, 1B and 3, to assure that the recording process can be interrupted and later restarted, while assuring that the recording of signals from the internal audio source will recommence at virtually the same point at which it was interrupted.
Figure 5:
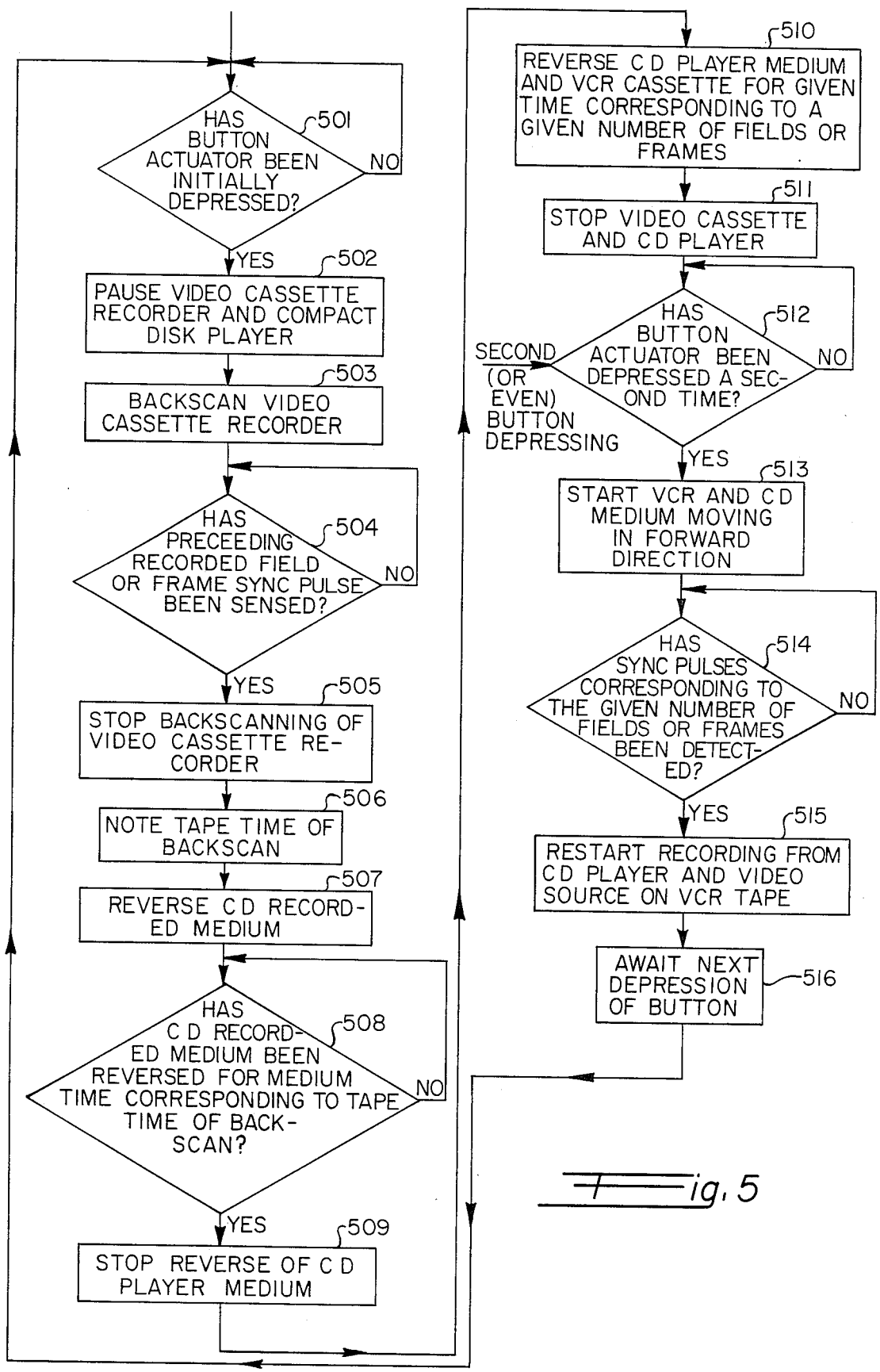
FIG. 5 is an exemplary flowchart useful in understanding the operation of the circuit of FIG. 4 and setting out a series of operational steps controlled.

Turning now to FIG. 4, which shows some details of the microprocessor arrangement. As shown, a microprocessor 400 is caused to start executing the routine shown in FIG. 5 by simply depressing the button actuator 39 (FIG. 1A) on the hand-grip 37 (FIG. 1A). The microprocessor 400 is programmed (or hard-wired) to carry out the sequence of steps 501 to 512 illustrated in FIG. 5 upon the first depression (and later odd-number of depressions) of the button actuator 39. Thereafter, upon the second (and later even numbered) depressions of the button actuator 39, the microprocessor carries out the sequence of steps 513 to 516 illustrated in FIG. 5, the so called button to which reference is made in steps 501 and 512 being the button actuator 39 (FIGS. 1A, 2) which provides the input to the flip-flop 401 (FIG. 4). Thus, one is assured that the video and the further audio signals, the latter from the CD 53 (FIG. 1A) or another recorded external source are fed to the VCR so that the audio signals will appear to be virtually free of interruptions. The microprocessor 400 is provided with two control input signals provided respectively from the Q and $\bar{Q}$ output terminals of a bistable flip-flop 401. The Q output terminal is connected to a differentiating circuit constituted by the series connection of a capacitor 402 and a resistor 403 connected between the output terminal Q and a point of reference potential (ground). One input terminal of the microprocessor 400 is conductively connected to a circuit point between the capacitor 402 and the resistor 403. The $\bar{Q}$ output terminal of the flip-flop 401 is connected to a second differentiating circuit constituted by a capacitor 404 and resistor 405, one end of the resistor 405 being connected to the point of reference potential (ground). The second input terminal of the microprocessor 400 is conductively connected to a circuit point between the capacitor 404 and the resistor 405. A vertical sync pulse detector 406, which is operatively arranged to detect vertical sync pulses in the video output from the VCR within the camera 10 (FIG. 1A) during backscan and playback thereof, has its output connected to a data input terminal of the microprocessor 400. The detector 406 supplies a pulse to the microprocessor 400 upon each detection of a vertical sync pulse in the video output of the VCR.

Upon a depression of the button actuator 39 (FIG. 1A) a high (ONE) level appears for a time on a single input terminal of the bistate flip-flop 401, which initially has been set so that its Q output terminal is low (ZERO); as a result, the Q output terminal goes high (ONE). The leading edge of this wave is differentiated in the differentiating circuit consisting of the series connected capacitor 402 and the resistor 403, a positive going voltage spike appearing across the resistor 403; thus, the step 501 (FIG. 5) is accomplished and the microprocessor 400 carries out the steps 502–511 (FIG. 5) by producing the first five output command signals on its output lines 407–411. Upon a second depression of the button actuator 39, provided step 511 (FIG. 5) has been completed, the flip-flop 401 goes to its other bistable state, its Q output terminal goes low (ZERO) and the $\overline{Q}$ output terminal of the microprocessor goes high (ONE). The capacitor 404 and the resistor 405 effect a differentiation of the wave appearing on the output terminal $\overline{Q}$, a resulting positive going voltage spike appearing across the resistor 405. Thus, the step 512 is accomplished and the microprocessor 400 carries out the steps 513–516, producing further output command signals on its output lines 412–414. The entire sequence, is repeated as many times as desired to produce a recording of a sequence of scenes with music from the external or internal source of further recorded audio signals seemingly uninterrupted.

It is to be appreciated, that the foregoing description and accompanying illustrations have been set out by way of example, not by way of limitation. Numerous variants and other embodiments are possible without departing from the spirit and scope of the invention, its scope being defined in the appended claims.

What is claimed is:

1. In a hand-held video recording camera having a lens, an image pickup means operatively arranged to receive image information from the lens for converting the image information into an electric image data output signal, microphonic means operatively arranged to receive sound from a subject or subjects within view of the lens for producing audio signals corresponding to the sound received and means for recording signals representing the image data and audio signals, an improvement comprising a source within the hand-held camera of further audio signals; audio mixing means within the hand-held camera for mixing the audio signals corresponding to the sound received by said microphone means and to the further audio signals, said audio mixing means having its output coupled to said means for recording signals representing the image data and the audio signals; and reproducing means carried by the hand-held recording camera and responsive to the further audio signals from said source of further audio signals within the hand-held camera for projecting sound corresponding to the further audio signals toward a subject or subjects to be recorded.

2. The hand-held video camera according to claim 1, wherein said source within the hand-held camera of audio signals comprises a compact disk player.

3. The hand-held camera according to claim 1, including means for adjusting level of the further audio signals in circuit between said source of the further audio signals and said reproducing means responsive to the further audio signals whereby level of sound projected toward a subject or subjects may be adjustably set.

4. The hand-held video recording camera according to claim 3, wherein the recording camera includes a hand-grip and wherein said means in circuit for adjusting level of the further audio signals, whereby level of sound projected may be adjustably set, includes an actuator carried by the hand-grip and accessible to an operator holding the camera.

5. The hand-held video recording camera according to claim 3, including additional means for adjusting the level of the further audio signals in circuit between said source of further audio signals and said audio mixing means, whereby level of the audio signals from the source of further audio signals can be independently adjusted with respect to audio signals received from said microphone means.

6. The hand-held video recording camera according to claim 5, wherein said recording camera includes a hand-grip and wherein said means in circuit between said source of further audio signals and said audio mixing means, whereby level of the audio signals from the source of further audio signals can be independently adjusted, includes an actuator carried by the hand-grip and accessible to an operator holding the camera.

7. The hand-held video recording camera according to claim 3, wherein the recording camera includes a hand-grip and wherein said means in circuit for adjusting level of the further audio signals, whereby level of the sound projected may be adjustably set, includes a first actuator carried by the hand-grip and accessible to an operator holding the camera, and including additional means for adjusting the level of the further audio signals in circuit between said source of further audio signals and said audio mixing means, whereby level of the audio signals from the source of further audio signals can be independently adjusted with respect to audio signals received from said microphone means, said additional means including an additional actuator carried by the hand-grip and accessible to an operator holding the camera.

8. The hand-held video recording camera according to claim 7, including receptor means on the camera for receiving an audio signal from an external audio source.

9. The hand-held video recording camera according to claim 8, including means responsive to the presence of a connection to said receptor means for interrupting audio being fed to said mixing means from said source of said further audio signals within the hand-held camera and for allowing audio signals from the external audio source to be fed to said mixing means via said connection and said receptor means.

10. The hand-held video recording camera according to claim 7, including receptor means on the hand-held camera coupled to the source of audio signals within the hand-held camera, further reproducing means for projecting sound corresponding to the further audio signals toward a subject or subjects to be recorded, and extension cord means extending from said receptor means to said further reproducing means whereby audio signals from the source of further audio signals may be projected toward the subject or subjects from points which are remote from the hand-held recording camera.

11. The hand-held video recording camera according to claim 10, including means responsive to the presence of a connection to the receptor means for interrupting audio being fed to said reproducing means carried by the hand-held camera for interrupting audio signals being fed to said reproducing means carried by the recording camera and for allowing audio signals from the source of further audio signals within the recording camera to be fed to said further reproducing means.

12. The hand-held video recording camera according to claim 7, including radio transmitting means on the hand-held camera modulated from the source of audio signals within the hand-held camera, remote radio receiving means for receiving signals from said radio transmitting means for demodulating the received signals and projecting sound corresponding to the further audio signals toward a subject or subjects to be recorded, whereby audio signals from the source of further audio signals may be projected toward the subject or subjects from points which are remote from the hand-held recording camera.

13. The hand-held video recording camera according to claim 1, including receptor means on the camera for receiving an audio signal from an external audio source.

14. The hand-held video recording camera according to claim 13, including means responsive to the presence of a connection to said receptor means for interrupting audio being fed to said mixing means from said source of said further audio signals within the hand-held camera and for allowing audio signals from the external audio source to be fed to said mixing means via said connection and said receptor means.

15. The hand-held video recording camera according to claim 1, including receptor means on the hand-held camera coupled to the source of audio signals within the hand-held camera, further reproducing means for projecting sound corresponding to the further audio signals toward a subject or subjects to be recorded, and extension cord means extending from said receptor means to said further reproducing means whereby audio signals from the source of further audio signals may be projected toward the subject or subjects from points which are remote from the hand-held recording camera.

16. The hand-held video recording camera according to claim 15, including means responsive to the presence of a connection to the receptor means for interrupting audio being fed to said reproducing means carried by the hand-held camera for interrupting audio signals being fed to said reproducing means carried by the recording camera and for allowing audio signals from the source of further audio signals within the recording camera to be fed to said further reproducing means.

17. The hand-held video recording camera according to claim 1, including radio transmitting means on the hand-held camera modulated from the source of audio signals within the hand-held camera, remote radio receiving means for receiving signals from said radio transmitting means for demodulating the received signals and supply sound corresponding to the further audio signals to a subject or subjects to be recorded, whereby audio signals from the source of further audio signals may be projected toward the subject or subjects from points which are remote from the hand-held recording camera.

18. The hand-held video recording camera according to claim 1, including means for assuring that when the video recorder is restarted to record scenes in sequence, audio signals from the internal source of further audio signal start to be recorded at substantially the point of prior interruption.

19. In a hand-held video recording camera having a lens, an image pickup means operatively arranged to receive image information from the lens for converting the image information into an electric image data output signal, microphonic means operatively arranged to receive sound from a subject or subjects within view of the lens for producing audio signals corresponding to the sound recevied and means for recording signals representing the image data and audio signals, an improvement comprising a source within the hand-held camera of further audio signals; audio mixing means within the hand-held camera for mixing the audio signals corresponding to the sound received by said microphone means and to the further audio signals, said audio mixing means having its output coupled to said means for recording signals representing the image data and the audio signals; and reproducing means responsive to the further audio signals from said source of further audio signals within the hand-held camera for projecting sound corresponding to the further audio signals toward a subject or subjects to be recorded.

20. The hand-held video camera according to claim 19, wherein said source within the hand-held camera of audio signals comprises a compact disk player.

21. The hand-held video recording camera according to claim 19, including means for adjusting the level of the further audio signals in circuit between said source of further audio signals and said audio mixing means, whereby level of the audio signals from the source of further audio signals can be independently adjusted with respect to audio signals received from said microphone means.

22. The hand-held video recording camera according to claim 21, wherein said recording camera includes a hand-grip and wherein said means in circuit between said source of further audio signals and said audio mixing means, whereby level of the audio signals from the source of further audio signals can be independently adjusted, includes an actuator carried by the hand-grip and accessible to an operator holding the camera.

23. The hand-held video recording camera according to claim 19, including receptor means on the camera for receiving an audio signal from an external audio source.

24. The hand-held video recording camera according to claim 23, including means responsive to the presence of a connection to said receptor means for interrupting audio being fed to said mixing means from said source of said further audio signals within the hand-held camera and for allowing audio signals from the external audio source to be fed to said mixing means via said connection and said receptor.

25. In a hand-held video recording camera having a lens, an image pickup means operatively arranged to receive image information from the lens for converting the image information into an electric image data output signal, microphonic means operatively arranged to receive sound from a subject or subjects within view of the lens for producing audio signals corresponding to the sound received and means for recording signals representing the image data and audio signals, an improvement comprising a source within the hand-held camera of further audio signals; and reproducing means carried by the hand-held recording camera and responsive to the further audio signals from said source of further audio signals within the hand-held camera for projecting sound corresponding to the further audio signals toward a subject or subjects to be recorded.

26. The hand-held video camera according to claim 25, wherein said source within the hand-held camera of audio signals comprises a compact disk player.

27. The hand-held camera according to claim 25, including means for adjusting level of the further audio signals in circuit between said source of the further audio signals and said reproducing means responsive to the further audio signals whereby level of sound projected toward a subject or subjects may be adjustably set.

28. The hand-held video recording camera according to claim 27, wherein the recording camera includes a hand-grip and wherein said means in circuit for adjusting level of the further audio signals, whereby level of sound projected may be adjustably set includes an actuator carried by the hand-grip and accessible to an operator holding the camera.

29. The hand-held video recording camera according to claim 25, including receptor means on the camera for receiving an audio signal from an external audio source.

30. The hand-held video recording camera according to claim 25, including receptor means on the hand-held camera coupled to the source of audio signals within the hand-held camera, further reproducing means for projecting sound corresponding to the further audio signals toward a subject or subjects to be recorded, and extension cord means extending from said receptor means to said further reproducing means whereby audio signals from the source of further audio signals may be projected toward the subject or subjects from points which are remote from the hand-held recording camera.

31. The hand-held video recording camera according to claim 30, including means responsive to the presence of a connection to the receptor means for interrupting audio being fed to said reproducing means carried by the hand-held camera for interrupting audio signals being fed to said reproducing means carried by the recording camera and for allowing audio signals from the source of further audio signals within the recording camera to be fed to said further reproducing means.

32. The hand-held video recording camera according to claim 25, including radio transmitting means on the hand-held camera modulated from the source of audio signals within the hand-held camera, remote radio receiving means for receiving signals from said radio transmitting means for demodulating the received signals and supply sound corresponding to the further audio signals to a subject or subjects to be recorded, whereby audio signals from the source of further audio signals may be projected toward the subject or subjects from points which are remote from the hand-held recording camera.

33. The hand-held video recording camera according to claim 25, including means for assuring that when the video recorder is restarted to record scenes in sequence, audio signals from the internal source of further audio signals start to be recorded at substantially the point of prior interruption.

34. In a hand-held video recording camera having a lens, an image pickup means operatively arranged to receive image information from the lens for converting the image information into an electric image data output signal, microphonic means operatively arranged to receive sound from a subject or subjects within view of the lens for producing audio signals corresponding to the sound received and means for recording signals representing the image data and audio signals, an improvement comprising a source within the hand-held camera of further audio signals; audio mixing means within the hand-held camera for mixing the audio signals corresponding to the sound received by said microphone means and to the further audio signals, said audio mixing means having its output coupled to said means for recording signals representing the image data and the audio signals; and means for assuring when the video recorder is restarted to record scenes in sequence, audio signals from the internal source within the hand-held camera of further audio signals start to be recorded at virtually point of prior interruption of signals from the source.

35. The hand-held video camera according to claim 34, including reproducing means carried by the hand-held recording camera and responsive to the further audio signals from said source of further audio signals within the hand-held camera for projecting sound corresponding to the further audio signals toward a subject or subjects to be recorded.

36. The hand-held camera according to claim 35, including means for adjusting level of the further audio signals in circuit between said source of the further audio signals and said reproducing means responsive to the further audio signals whereby level of sound projected toward a subject or subjects may be adjustably set.

37. The hand-held video recording camera according to claim 36, wherein the recording camera includes a hand-grip and wherein said means in circuit for adjusting level of the further audio signals, whereby level of sound projected may be adjustably set, includes an actuator carried by the hand-grip and accessible to an operator holding the camera.

38. The hand-held video camera according to claim 34, wherein said source within the hand-held camera of audio signals comprises a compact disk player.

39. The hand-held video recording camera according to claim 34, including additional means for adjusting the level of the further audio signals in circuit between said source of further audio signals and said audio mixing means, whereby level of the audio signals from the source of further audio signals can be independently adjusted with respect to audio signals received from said microphone means.

40. The hand-held video recording camera according to claim 39, wherein said recording camera includes a hand-grip and wherein said means in circuit between said source of further audio signals and said audio mixing means, whereby level of the audio signals from the source of further audio signals can be independently adjusted, includes an actuator carried by the hand-grip and accessible to an operator holding the camera.

41. The hand-held video recording camera according to claim 34, wherein the recording camera includes a hand-grip, means for adjusting level of the further audio signals in circuit between said source of further audio signals and said reproducing means, whereby level of the sound projected may be adjustably set, includes a first actuator carried by the hand-grip and accessible to an operator holding the camera, and including additional means for adjusting the level of the further audio signals in circuit between said source of further audio signals and said audio mixing means, whereby level of the audio signals from the source of further audio signals can be independently adjusted with respect to audio signals received from said microphone means, said additional means including an additional actuator carried by the hand-grip and accessible to an operator holding the camera.

42. In a system which includes a hand-held video recording camera having a lens, an image pickup means operatively arranged to receive image information from the lens for converting the image information into an electric image data output signal, microphonic means operatively arranged to receive sound from a subject or subjects within view of the lens for producing audio signals corresponding to the sound received and means for recording signals representing the image data and audio signals, an improvement comprising a source of further audio signals; audio mixing means within the hand-held camera for mixing the audio signals corresponding to the sound received by said microphone means and to the further audio signals, said audio mixing means having its output coupled to said means for recording signals representing the image data and the audio signals; and means for assuring when the video recorder is restarted to record scenes in sequence, audio signals from the source of further audio signals start to be recorded at virtually point of prior interruption of signals from the source.

43. The system according to claim 42, wherein said source of further audio signals is a compact disk player.

* * * * *